Jan. 13, 1942.　　　　F. JANSEY　　　　2,270,005
VIEWING DEVICE
Filed Dec. 2, 1939

Inventor:
Felix Jansey.
By Chritton, Wiles, Davies, Hirsch & Dawson.
Attys.

Patented Jan. 13, 1942

2,270,005

UNITED STATES PATENT OFFICE 2,270,005

VIEWING DEVICE

Felix Jansey, Chicago, Ill.

Application December 2, 1939, Serial No. 307,325

3 Claims. (Cl. 88—1)

This application relates to a viewing device and more particularly to a viewing device in combination with a measuring device in which an arcuate scale is made to appear straight by means of the viewing device.

It is quite customary in many weighing machines, radios and other devices to employ a circular or arcuate scale. A portion of this scale is then viewed through a suitable opening, or all of it may be exposed to the eye. Many individuals are confused by such a scale and are unable accurately to read it. In the present device means are provided for viewing the scale which include an optical device such as a lens for producing pin cushion distortion of the viewed portion of the scale. The amount of distortion is correlated to the radius of curvature of the scale to produce the appearance of a straight scale in the viewed segment. If desired, however, a straight scale can be caused to appear curved by the imposition of barrel distortion.

Figure 1:
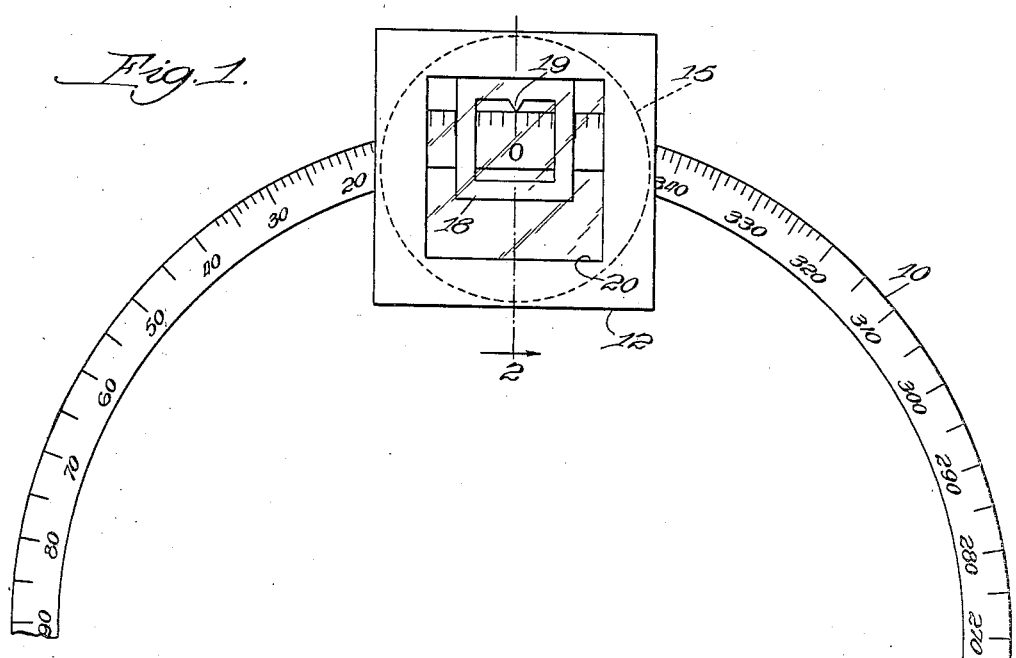
Figure 2:
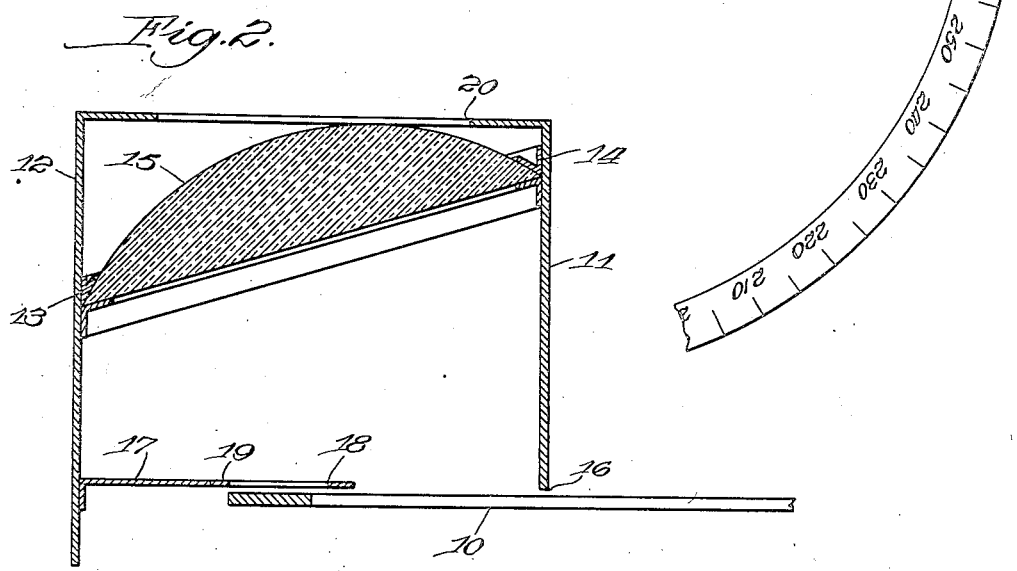

The invention is illustrated in the drawing, in which Figure 1 is a front view, broken away, of a circular scale and the viewing device; and Figure 2 is a cross section taken along the line 2 of Figure 1.

The device consists of the scale 10 which may be carried by any dial or mounting and which is movably mounted in any suitable fashion (not shown) to register any desired measurement. The viewing device 11, as shown, consists of a box 12 containing mountings 13 and 14 in which an ordinary condenser lens 15 is shown. An opening 16 is provided at one side of the box through which the scale 10 projects. Near the bottom of the box a screen 17 is mounted having an opening 18 through which a small section of the scale may be viewed. A pointer 19 indicates the center of the opening. A larger opening 20 is provided in the top of the box. If desired, the opening 20 may be made smaller and the screen 17 discarded, but such an arrangement permits less light to enter the lens.

In place of the condenser lens shown, any other lens capable of producing the appropriate distortion may be employed, such as meniscus paraboloid lens. The lens may be flat, tilted, reversed, or a combination of lenses may be employed to give the same result.

When pin cushion distortion is desired, as in the example shown, the optical device employed to produce the pin cushion distortion is so arranged with respect to the scale and to the viewing opening as to produce the proper amount of distortion to straighten out the scale. In the structure shown in the drawing it will be noted that the viewed section of the scale is considerably out of focus with respect to the lens.

The same device may be employed, of course, to produce a curved appearance in a straight scale or to increase the curvature of an already curved scale.

While I have shown and described certain embodiments of my invention, it is to be understood that it is capable of many modifications. Changes, therefore, in the construction and arrangement may be made without departing from the spirit and scope of the invention as disclosed in the appended claims.

What I claim as new, and desire to secure by Letters Patent, is:

1. In combination: a curved planar scale; and a plano-convex lens mounted in front of said scale with its plane surface angularly arranged with respect to the plane of the scale, whereby the curved portion of the same may be viewed through said lens, said lens causing refraction of the rays of light reflected from said viewed portion to cause said portion to appear substantially straight to the eye instead of curved.

2. In combination: a circular planar scale and a plano-convex lens mounted in front of said scale with its plane surface angularly arranged with respect to the plane of the scale, whereby an arcuate portion of the same may be viewed through said lens, said lens causing refraction of the rays of light reflected from said viewed portion to cause said portion to appear substantially straight to the eye instead of arcuate.

3. In combination: a circular planar scale movable in its plane about its center of curvature, and a plano-convex lens mounted in front of said scale with its plane surface angularly arranged with respect to the plane of the scale, whereby an arcuate portion of the scale may be viewed through said lens, said lens causing refraction of the rays of light reflected from said portion to cause said portion to appear substantially straight to the eye instead of arcuate.

FELIX JANSEY.